United States Patent
Liao et al.

(10) Patent No.: US 11,292,235 B2
(45) Date of Patent: Apr. 5, 2022

(54) INSULATION FILM AND METHOD FOR MAKING INSULATION FILM

(71) Applicant: Illinois Tool Works Inc., Glenview, IL (US)

(72) Inventors: Hong Chuan Liao, Shanghai (CN); Chris Benson, Addison, IL (US); Yong Liang, Shanghai (CN); Tom Carlson, Addison, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 291 days.

(21) Appl. No.: 16/720,930

(22) Filed: Dec. 19, 2019

(65) Prior Publication Data

US 2020/0122440 A1 Apr. 23, 2020

Related U.S. Application Data

(62) Division of application No. 14/649,152, filed as application No. PCT/US2013/071343 on Nov. 21, 2013, now Pat. No. 10,576,717.

(30) Foreign Application Priority Data

Dec. 3, 2012 (CN) .......................... 201210510162.0
Dec. 3, 2012 (CN) .......................... 201210511014.0

(51) Int. Cl.
  *B32B 27/08* (2006.01)
  *B32B 37/15* (2006.01)
  (Continued)

(52) U.S. Cl.
  CPC .......... *B32B 27/08* (2013.01); *B29C 48/0011* (2019.02); *B29C 48/08* (2019.02);
  (Continued)

(58) Field of Classification Search
  CPC ....................................................... B32B 27/08
  (Continued)

(56) References Cited

U.S. PATENT DOCUMENTS 4,477,544 A  10/1984 Bruder
4,824,723 A  4/1989 Campbell et al.
(Continued)

FOREIGN PATENT DOCUMENTS

CN  1735508 A  2/2006
CN  201889935 U  7/2011
(Continued)

OTHER PUBLICATIONS

International Search Report for PCT/US2013/071341 dated Feb. 25, 2014, 5 pages.
(Continued)

*Primary Examiner* — Tahseen Khan
(74) *Attorney, Agent, or Firm* — Klintworth & Rozenblat IP LLP

(57) ABSTRACT

The present invention provides an insulation film, comprising a film upper layer and a film lower layer, wherein both of the film upper layer and film lower layer are made of a PC or PET material, the PC or PET material contains a flame retardant to meet the flame retardance and puncture resistance property thereof; a film intermediate layer located between the film upper layer and the film lower layer, the film intermediate layer is made of the blends of PP and/or PE and PC and/or PET; an upper surface of the film intermediate layer is bound together with a lower surface of the film upper layer, a lower surface of the film intermediate layer is bound together with an upper surface of the film lower layer.

20 Claims, 5 Drawing Sheets

(51) Int. Cl.

| | | |
|---|---|---|
| *B32B 37/08* | (2006.01) | |
| *B32B 37/10* | (2006.01) | |
| *B29C 48/08* | (2019.01) | |
| *B29C 48/00* | (2019.01) | |
| *B29C 48/21* | (2019.01) | |
| *B32B 27/18* | (2006.01) | |
| *B32B 27/32* | (2006.01) | |
| *B29C 65/00* | (2006.01) | |
| *B32B 27/36* | (2006.01) | |
| *B32B 37/12* | (2006.01) | |
| *B29K 23/00* | (2006.01) | |
| *B29K 69/00* | (2006.01) | |
| *B29L 7/00* | (2006.01) | |
| *B29L 9/00* | (2006.01) | |
| *B29L 31/34* | (2006.01) | |

(52) U.S. Cl.
CPC ........ *B29C 48/21* (2019.02); *B29C 66/83411* (2013.01); *B32B 27/18* (2013.01); *B32B 27/32* (2013.01); *B32B 27/36* (2013.01); *B32B 27/365* (2013.01); *B32B 37/08* (2013.01); *B32B 37/1027* (2013.01); *B32B 37/12* (2013.01); *B32B 37/153* (2013.01); *B29K 2023/06* (2013.01); *B29K 2023/12* (2013.01); *B29K 2069/00* (2013.01); *B29K 2995/0007* (2013.01); *B29L 2007/00* (2013.01); *B29L 2009/00* (2013.01); *B29L 2031/3412* (2013.01); *B32B 2250/03* (2013.01); *B32B 2250/242* (2013.01); *B32B 2250/244* (2013.01); *B32B 2264/0278* (2013.01); *B32B 2264/0285* (2013.01); *B32B 2307/206* (2013.01); *B32B 2307/3065* (2013.01); *B32B 2307/558* (2013.01); *B32B 2307/5825* (2013.01); *B32B 2323/04* (2013.01); *B32B 2323/10* (2013.01); *B32B 2457/00* (2013.01); *B32B 2457/04* (2013.01); *Y10T 428/2495* (2015.01); *Y10T 428/31507* (2015.04); *Y10T 428/31786* (2015.04)

(58) Field of Classification Search
USPC ........................................................ 428/213
See application file for complete search history.

(56) References Cited

U.S. PATENT DOCUMENTS

| | | | |
|---|---|---|---|
| 5,260,372 A | | 11/1993 | Toporcer et al. |
| 6,276,104 B1 | | 8/2001 | Long, Sr. et al. |
| 7,564,209 B2 | | 7/2009 | Mochizuki et al. |
| 2002/0128358 A1 | * | 9/2002 | Murschall ............... C09K 21/12 524/115 |
| 2003/0114022 A1 | | 6/2003 | Franzen et al. |
| 2004/0066640 A1 | | 4/2004 | Fujii et al. |
| 2004/0247819 A1 | * | 12/2004 | Khieu ..................... B32B 33/00 428/74 |
| 2006/0011108 A1 | | 1/2006 | Abu-Isa et al. |
| 2006/0110613 A1 | | 5/2006 | Ye et al. |
| 2007/0014978 A1 | | 1/2007 | Poloso |
| 2007/0230156 A1 | | 10/2007 | Chen |
| 2007/0248746 A1 | * | 10/2007 | Ito ....................... H01L 51/0004 427/64 |
| 2009/0034054 A1 | * | 2/2009 | Ikegami ................. G03G 17/04 359/296 |
| 2010/0096181 A1 | | 4/2010 | Nakamura et al. |
| 2010/0282488 A1 | | 11/2010 | Zheng et al. |
| 2011/0236662 A1 | * | 9/2011 | Fukuda .................. B32B 27/286 428/216 |
| 2012/0252947 A1 | | 10/2012 | Im et al. |

FOREIGN PATENT DOCUMENTS

| | | | |
|---|---|---|---|
| CN | 102171773 | A | 8/2011 |
| CN | 103550864 | A | 2/2014 |
| DE | 4038827 | A1 | 6/1992 |
| EP | 0248208 | A2 | 12/1987 |
| EP | 0377513 | A2 | 7/1990 |
| EP | 0795399 | A1 | 9/1997 |
| JP | H06 79846 | A | 3/1994 |
| JP | 2001-71438 | A | 9/2002 |
| JP | 2004-98325 | A | 10/2005 |
| JP | 2005-335101 | A | 12/2005 |
| JP | 2007146049 | A1 | 6/2007 |
| JP | 2010278293 | | 12/2010 |
| JP | 2011052094 | | 3/2011 |
| WO | 2011/148330 | A1 | 12/2011 |

OTHER PUBLICATIONS

International Search Report for PCT/US2013/071342 dated Feb. 25, 2014, 5 pages.
International Search Report for PCT/US2013/071343 dated Feb. 25, 2014, 5 pages.
International Search Report for PCT/US2015/036133 dated Aug. 31, 2015, 4 pages.
Handbook for Sythetic Resin and Plastics, published by Shanghai Science and Technology Press on Aug. 31, 1993, Yunbiao Gong, et al., pp. 1265-1267.
Engineering Plastics and the Applications Thereof, published by Mechanical Industry Press on Apr. 30, 2006, Xinmin Fan, et al., pp. 210-214.

* cited by examiner

INSULATION FILM AND METHOD FOR MAKING INSULATION FILM

FIELD OF THE INVENTION

The present invention relates to an insulation film, and particularly to an insulation film made of PC or PET.

BACKGROUND OF THE INVENTION

An insulation film is used to isolate various electronic devices or components to avoid malfunction caused by short-circuiting, breakdown or the like between the electronic devices or components, or electronic elements in the electronic devices or components, and reduce the risk of catching fire of the electronic devices or components so as to guarantee normal operation of various electronic elements. For example, the insulation film is placed between a printed circuit hoard (PCB) containing various circuits and a metallic housing such as an aluminum or copper housing for preventing EMI (electromagnetic interference) to prevent problems such as shortcricuiting caused by contact between the various elements on the PCB and the metallic housing. In order to use the insulation film, the insulation film is required to have properties such as flame retardance and resistance against long-term high temperature. Furthermore, specific indices for the requirements for these properties of the insulation film vary with different requirements for insulation.

Since the raw material of PC and PET have good puncture resistance property, insulation films made of PC or PET are widely used. However, the folding endurance property of PC and PET is not good, and therefore, the PC and PET will be torn when being folded.

Therefore, it is desired to produce a insulation film having both good puncture strength and good folding endurance property.

SUMMARY OF THE INVENTION

The present invention provides an insulation film, comprising a film upper layer and a film lower layer, wherein both of the film upper layer and film lower layer are made of a PC or PET material, the PC or PET material contains a flame retardant to meet the flame retardance and puncture resistance property thereof; a film intermediate layer located between the film upper layer and the film lower layer, the film intermediate layer is made of the blends of PP and/or PE and PC and/or PET; an upper surface of the film intermediate layer is bound together with a lower surface of the film upper layer, a lower surface of the film intermediate layer is bound together with an upper surface of the film lower layer. The film upper layer and the film lower layer are made of like or identical material. The flame retardant in the film upper layer and the film lower layer contains a phosphor-containing flame retardant or a silicon-containing flame retardant or a bromine-containing flame retardant or a chlorine-containing flame retardant. The PC or PET in the film upper layer and the film lower layer accounts for 75%-99.7% of a mass of the film upper layer or film lower layer, and the flame retardant accounts for 0.3%-25% of the mass of the film upper layer or the film lower layer. Because the upper layer and the lower layer of the insulation film are made of PC or PET which is rigid, the puncture strength of the insulation film is substantially guaranteed. When thickness of the intermediate layer accounts for 5%-20% of the total thickness of the insulation film of the present invention, compared with the single-layered PCT or PET material having a same thickness with the insulation film of the present invention, the puncture strength of insulation film of the present invention decreases not obviously (only decreases by 1%~10%). On the other hand, because the intermediate layer made of the blends of PP and/or PE and PC and/or PET comprises PP and/or PE, the insulation film of the present invention has good folding endurance. Compared with the single-layered PC or PET material having a thickness of 0.4 mm, the foldability of the insulation film 100 having the same thickness of 0.4 mm according to the present invention is raised from 10-20 times to not less than 30 times under the test method of ASTM D2176-97a. Such folding endurance can meet the processing requirements. Therefore, the present invention provides a multi-layered insulation film having both good puncture strength and good folding endurance. The thickness of the film intermediate layer is 5%-50% of the thickness of the insulation film, and the thickness of the film upper layer and the film lower layer is 50%-95% of a total thickness of the insulation film. The total thickness of the insulation film is in a range of 0.05 mm-3.0 mm. The insulation film is formed by a co-extruding process or a composite process.

The present invention further provides a method of producing the insulation film. The method comprises: on a first extruder, extruding PC or PET particles containing the flame retardant to melt them, the PC or PET containing the flame retardant in a molten state flowing out of the first extruder and then through subsequent connecting pipes into a dispenser, the dispenser dividing the PC or PET containing the flame retardant in the molten state extruded out of the first extruder into two sections, namely, a first molten PC or PET containing the flame retardant and a second molten PC or PET containing the flame retardant; extruding on a second extruder the particles of the blends of PP and/or PE and PC and/or PET to make them molten, the blends of PP and/or PE and PC and/or PET in the molten state flowing out of the second extruder and then through subsequent connecting pipes into the dispenser, the blends of PP and/or PE and PC and/or PET in the molten state flowing into between the first molten PC or PET containing the flame retardant and the second molten PC or PET containing the flame retardant in the dispenser; the first molten PC or PET containing flame retardant, the blends of PP and/or PE and PC and/or PET in the molten state and the second molten PC or PET containing flame retardant being superimposed together and then flowing out of the dispenser, flowing through a die head into a cooling forming roller to be cooled and formed as a sheet/film.

The present invention further provides a method of producing the insulation film. The method comprises: on a first extruder, extruding PC or PET particles containing the flame retardant to melt them to form a first molten PC or PET containing the flame retardant, the first molten PC or PET containing the flame retardant flowing out of the first extruder and then through subsequent connecting pipes into a dispenser; extruding on a third extruder PC or PET particles containing the flame retardant to make them molten to form a second molten PC or PET containing the flame retardant, the second molten PC or PET containing the flame retardant being extruded out of the third extruder and then flowing through subsequent connecting pipes into the dispenser; extruding on a second extruder the blends of PP and/or PE and PC and/or PET to make them molten, the blends of PP and/or PE and PC and/or PET in the molten state flowing out of the second extruder and then through subsequent connecting pipes into the dispenser, the blends of PP and/or PE and PC and/or PET in the molten state flowing into between the first molten PC or PET containing the flame retardant and the second molten PC or PET containing the flame retardant in the dispenser; the first molten PC or PET containing flame retardant, the blends of PP and/or PE and PC and/or PET in the molten state and the second molten PC or PET containing flame retardant being superimposed together and then flowing out of the dispenser, flowing through a die head into a cooling forming roller to be cooled and formed as a sheet/film.

The present invention further provides a method of producing the insulation film. The method comprises: providing the film upper layer and the film lower layer, wherein both of the film upper layer and film lower layer are made of a PC or PET material and the PC or PET material contains a flame retardant; providing an intermediate layer located between the film upper layer and the film lower layer, the film intermediate layer is made of the blends of PP and/or PE and PC and/or PET; applying a glue to a lower surface of the film upper layer and/or an upper surface of the film intermediate layer, and applying a glue on an upper surface of the film lower layer and/or a lower surface of the film intermediate layer; delivering the film upper layer, film intermediate layer and film lower layer through pressing rollers to be pressed and formed as a sheet/film.

The present invention further provides a method of producing the insulation film. The method comprises: providing the film upper layer and the film lower layer, wherein both of the film upper layer and film lower layer are made of a PC or PET material and the PC or PET material contains a flame retardant; providing an intermediate layer located between the film upper layer and the film lower layer, the film intermediate layer is made of the blends of PP and/or PE and PC and/or PET; respectively heating the film upper layer, the film intermediate layer and the film lower layer to soften them; delivering the heated and softened film upper layer, film intermediate layer and film lower layer through pressing rollers to be pressed and formed as a sheet/film.

The present invention provides another insulation film, comprising: a film upper layer made of a PC or PET material, wherein the PC or PET material contains a flame retardant; and a film lower layer, wherein the film lower layer is made of the blends of PP and/or PE and PC and/or PET; a lower surface of the film upper layer is bound together with an upper surface of the film lower layer. The flame retardant in the film upper layer contains a phosphor-containing flame retardant or a silicon-containing flame retardant or a bromine-containing flame retardant or a chlorine-containing flame retardant. The PC or PET in the film upper layer accounts for 75%-99.7% of a mass of the film upper layer, and the flame retardant accounts for 0.3%-25% of the mass of the film upper layer. The PP and/or PE in the film lower layer accounts for 5%-95% of a mass of the film lower layer, the PC and/or PET in the film lower layer accounts for 4.5%-94.7% of a mass of the film lower layer and the additives in the film lower layer accounts for 0.3%-20% of a mass of the film lower layer. The total thickness of the insulation film is in a range of 0.05 mm-3.0 mm. The insulation film is formed by processing by a co-extruding process or a composite process.

The present invention further provides an insulation film, comprising two PC or PET layers containing the flame retardant and one layer made of the blends of PP and/or PE and PC and/or PET, wherein the two PC or PET layers containing the flame retardant are respectively bound together with an upper surface and a lower surface of the layer made of the blends of PP and/or PE and PC and/or PET. The flame retardant in the PC or PET layers containing the flame retardant contains a phosphor-containing flame retardant or a silicon-containing flame retardant or a bromine-containing flame retardant or a chlorine-containing flame retardant. The PC or PET accounts for 75%-99.7% of a mass of the PC or PET layers containing the flame retardant, and the flame retardant accounts for 0.3%-25% of the mass of the PC or PET layers containing the flame retardant. The PP and/or PE in the layer made of the blends of PP and/or PE and PC and/or PET accounts for 5%~95% of a mass of the layer made of the blends of PP and/or PE and PC and/or PET, the PC and/or PET in the layer made of the blends of PP and/or PE and PC and/or PET accounts for 4.5%~94.7% of a mass of the layer made of the blends of PP and/or PE and PC and/or PET and the additives in the layer made of the blends of PP and/or PE and PC and/or PET accounts for 0.3%~20% of a mass of the layer made of the blends of PP and/or PE and PC and/or PET. When thickness of the intermediate layer accounts for 5%~20% of the total thickness of the insulation film of the present invention, compared with the single-layered PCT or PET material having a same thickness with the insulation film of the present invention, the puncture strength of insulation film of the present invention decreases not obviously (only decreases by 1%~10%). Compared with the single-layered PC or PET material having a thickness of 0.4 mm, the foldability of the insulation film having the same thickness of 0.4 mm according to the present invention is raised from 10~20 times to no less than 30 times under the test method of ASTM D2176-97a. The thickness of the layer made of the blends of PP and/or PE and PC and/or PET is 5%-50% of the thickness of the insulation film, and a total of the thickness of the two PC or PET layers containing the flame retardant is 50%-95% of a total thickness of the insulation film. The total thickness of the insulation film is in a range of 0.05 mm-3.0 mm. The insulation film is formed by a co-extruding process or a composite process.

DETAILED DESCRIPTION OF PREFERRED EMBODIMENTS

Figure 1:
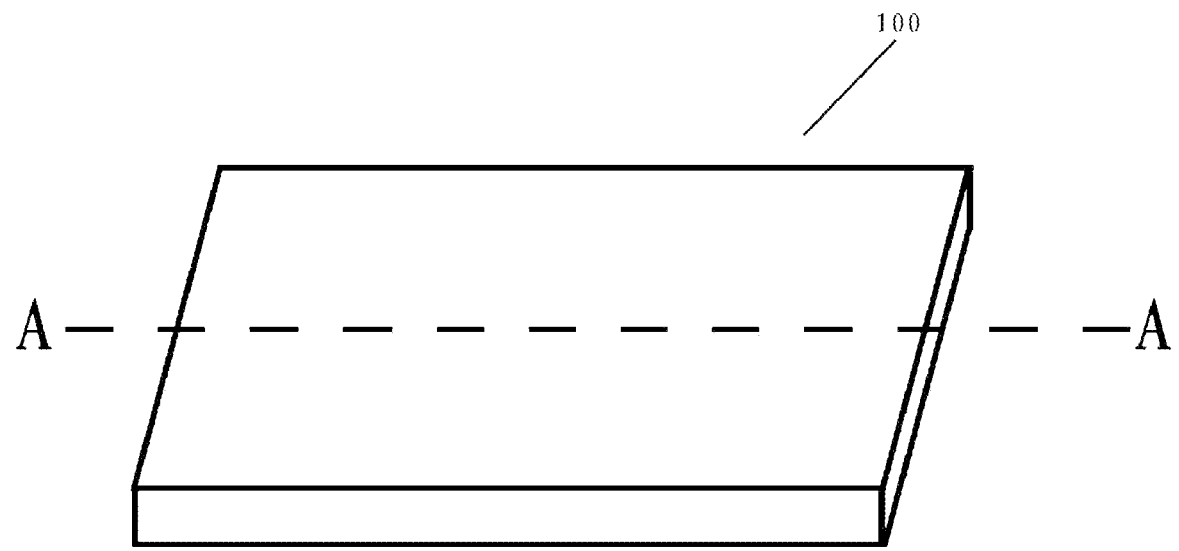
FIG. 1 is a schematic view of an insulation film containing a flame retardant according to an embodiment of the present invention.

FIG. 1 illustrates a schematic view of an insulation film 100 according to an embodiment of the present invention.

Figure 2:
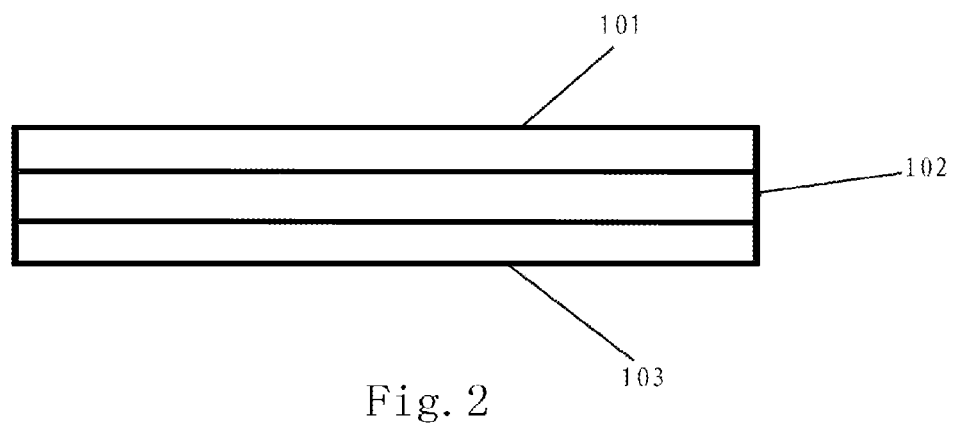
FIG. 2 is a cross-sectional view of the insulation film containing a flame retardant of FIG. 1 taken along the line A-A in FIG. 1.

According to one embodiment of the present invention, the insulation film 100 has a thickness of 0.05 mm-3.0 mm. FIG. 2 is a cross-sectional view of the insulation film 100 of FIG. 1 taken along the line A-A in FIG. 1. As shown in FIG. 2, the insulation film 100 comprises an upper layer 101, an intermediate layer 102 and a lower layer 103. According to an embodiment of the present invention, a thickness of the upper layer 101 and the lower layer 103 of the insulation film is 50-95% of the thickness of the insulation film, and a thickness of the intermediate layer of the insulation film is 5%-50% of the thickness of the insulation film.

The upper layer 101 and the lower layer 103 of the insulation film 100 are made of PC or PET containing a flame retardant. The flame retardant in the upper layer 101 and the lower layer 103 of the insulation film 100 comprises a phosphor-containing flame retardant or a silicon-containing flame retardant or a bromine-containing flame retardant or a chlorine-containing flame retardant. According to an embodiment of the present invention, a mass of the flame retardant in the upper layer 101 and the lower layer 103 of the insulation film 100 is 0.3%-25% of a mass of the upper layer 101 or the lower layer 103 of the insulation film and a mass of the PC or PET material in the upper layer 101 and the lower layer 103 of the insulation film 100 is 75%-99.7% of a mass of the upper layer 101 or the lower layer 103 of the insulation film so that the insulation film 100 has good flame retardance and good puncture strength. The intermediate layer 102 of the insulation film 100 is made of the blends of PP and/or PE and PC and/or PET. Since the blends of PP and/or PE and PC and/or PET of the intermediate layer 102 of the insulation film 100 contains PP and/or PE, the insulation film 100 has good folding endurance. The mass of the PP and/or PE accounts for 5%~95% of the mass of the intermediate layer 102, the mass of the PC and/or PET accounts for 4.5%~94.7% of the mass of the intermediate layer 102 and the additives accounts for 0.3%~20% of the mass of the intermediate layer 102.

Because the insulation film 100 of the present invention has a layer made of the blends of PP and/or PE and PC and/or PET, the insulation film 100 of the present invention has the following advantages:

Because the upper layer 101 and the lower layer 103 of the insulation film are made of PC or PET which is rigid, the puncture strength of the insulation film is substantially guaranteed. When thickness of the intermediate layer accounts for 5%~20% of the total thickness of the insulation film of the present invention, compared with the single-layered PCT or PET material having a same thickness with the insulation film of the present invention, the puncture strength of insulation film of the present invention decreases not obviously (only decreases by 1%~10%). On the other hand, because the intermediate layer made of the blends of PP and/or PE and PC and/or PET comprises PP and/or PE, the insulation film of the present invention has good folding endurance. Compared with the single-layered PC or PET material having a thickness of 0.4 mm, the foldability of the insulation film 100 having the same thickness of 0.4 mm according to the present invention is raised from 10~20 times to not less than 30 times under the test method of ASTM D2176-97a. Such folding endurance can meet the processing requirements. Therefore, the present invention provides a multi-layered insulation film having both good puncture strength and good folding endurance.

Furthermore, the Inventor found that the current regulatory standards (e.g., the international standard UL-60950 or IEC-60950) for the insulation film requires at least a thickness of 0.4 mm for a single-layered insulation film made of a homogeneous material if supplementary insulation or reinforced insulation is required for the single-layered insulation film. However, the UL standard does not impose such requirement of thickness for a multi-layered insulation film comprising inseparable layers, but the UL standard requires the voltage resistance of the multi-layered insulation film comprising inseparable layers to increase by 50%~100% and requires the multi-layered insulation film comprising inseparable layers to pass the additional Mandrel test. That is to say, even if a multi-layered insulation film comprising inseparable layers has a thickness of less than 0.4 mm, it is considered as meeting the regulatory standards so long as it passes the stricter voltage withstanding test and the additional Mandrel test. The insulation film of the present invention is a multi-layered insulation film having inseparable multiple layers which are made of different materials, and it is found after experiments that the material for the insulation film of the present invention can exactly pass the stricter voltage withstanding test and the additional Mandrel test. Therefore, to meet the requirement under the regulatory standards, the thickness of the insulation film may be less than 0.4 mm. In other words, as compared with the conventional single-layered PC or PET insulation film containing the flame retardant, the insulation film according to the present invention has a reduced thickness, for example, the thickness of the insulation film can be reduced from 0.43 mm to 0.25 mm or thinner, while the insulation film according to the present invention can pass the stricter voltage withstanding test and the additional Mandrel test, thereby saving the material and cutting the production costs.

Figure 3:
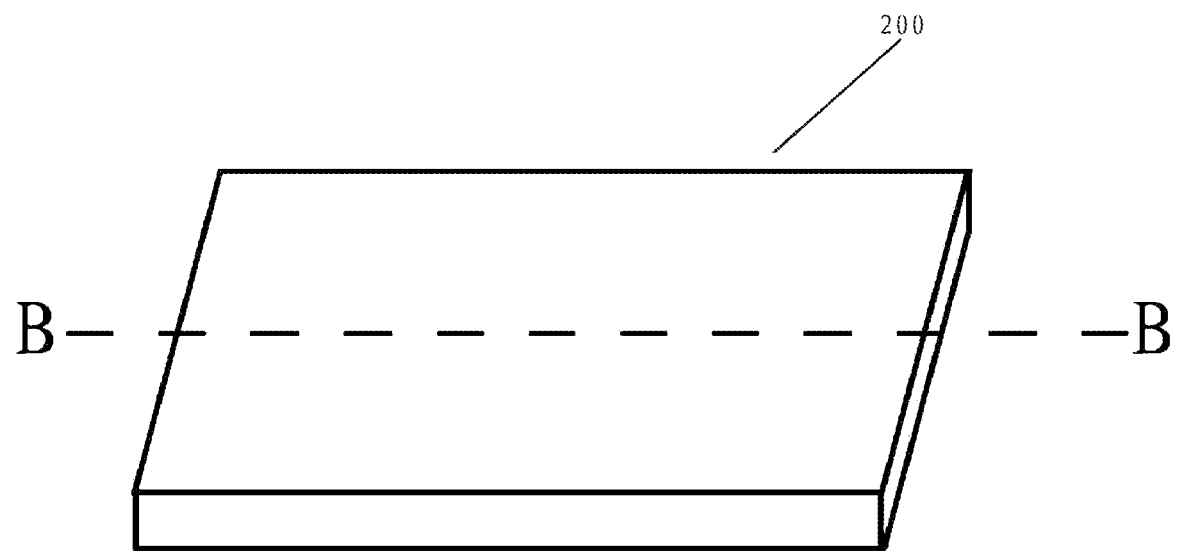
FIG. 3 is a schematic view of an insulation film containing a flame retardant according to another embodiment of the present invention.
Figure 4:
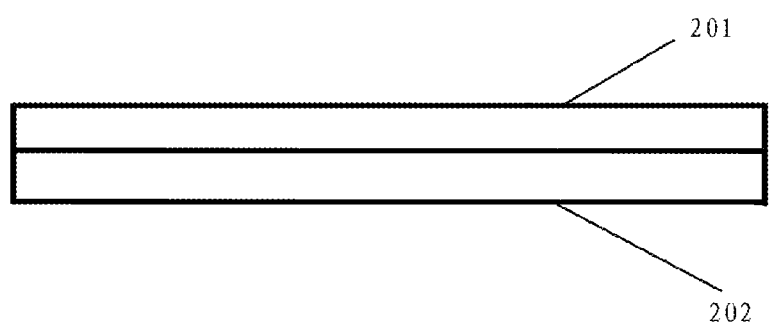
FIG. 4 is a cross-sectional view of the insulation film containing a flame retardant of FIG. 3 taken along the line B-B in FIG. 3.

FIG. 3 is a schematic view of a film 200 according to another embodiment of the present invention. The only difference between the insulation film 200 and the insulation film 100 in FIG. 1 lies in that the insulation film 200 has a structure of two layers, wherein one layer is made of PC or PET containing the flame retardant and the other layer is made of the blends of PP and/or PE and PC and/or PET. FIG. 4 is a cross-sectional view taken along a line B-B of FIG. 3 to illustrate the structure of the insulation film 200 having two layers (201, 202). The two-layered insulation film shown in FIG. 3 and FIG. 4 also has the layer made of the blends of PP and/or PE and PC and/or PET, and therefore has the same advantages of the insulation film shown in FIG. 1 and FIG. 2. Certainly, the principles of the present invention also apply to other multi-layered insulation films made of different materials.

Figure 5:
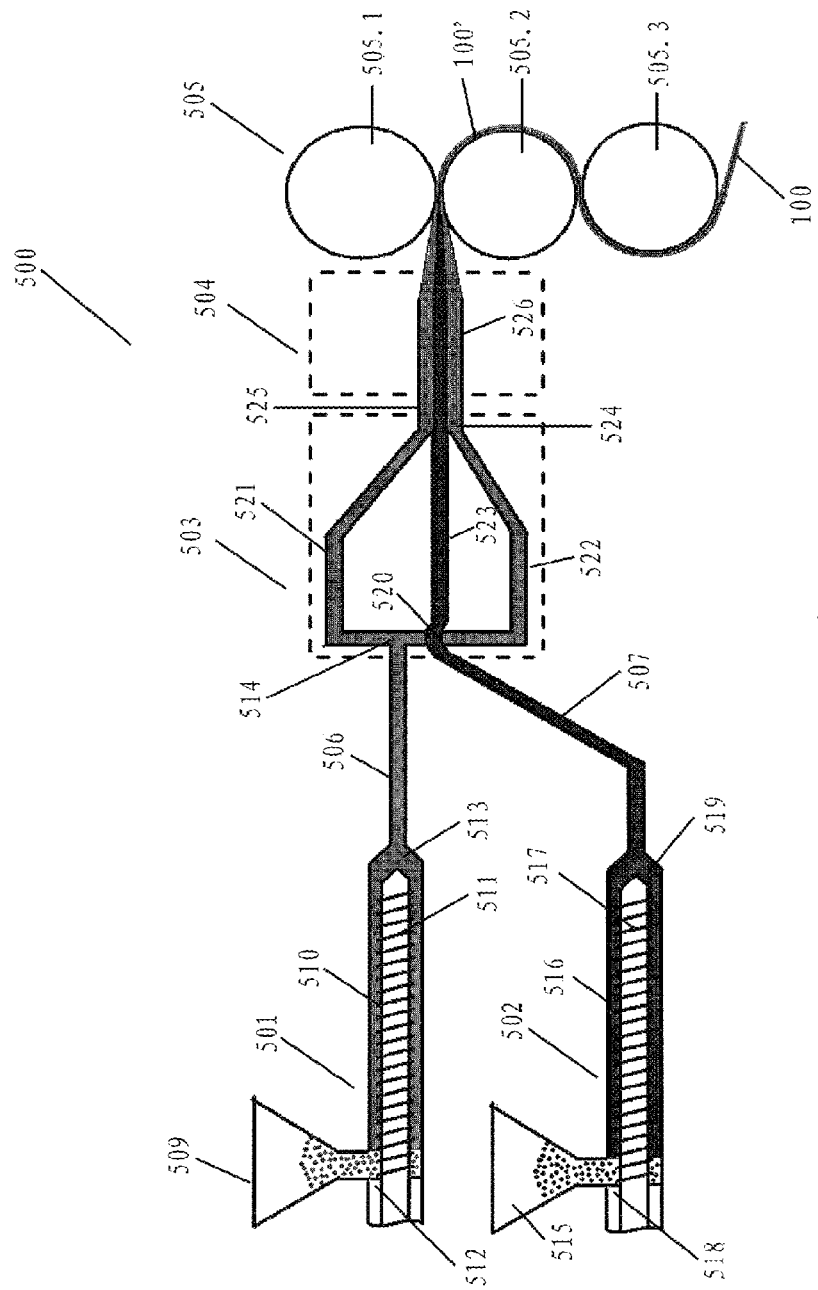
FIG. 5 is an exemplary view of a co-extruding process for producing the insulation film according to an embodiment of the present invention.

FIG. 5 illustrates a co-extruding assembly line 500 of a co-extruding process for producing the insulation film 100 according to an embodiment of the present invention. As shown in FIG. 5, the co-extruding assembly line 500 comprises a first extruder 501 and a second extruder 502. The first extruder 501 comprises a feeding hopper 509 and a receiving cavity 510. The feeding hopper 509 is configured to receive PC or PET particles containing the flame retardant. The receiving cavity 510 is provided with a driving screw 511. An outlet of the feeding hopper 509 is communicated with a front end inlet 512 of the receiving cavity 510, a rear end outlet 513 of the receiving cavity 510 is communicated with an inlet of a pipe 506, and an outlet of the pipe 506 is communicated with a first inlet 514 of a dispenser 503. The second extruder 502 comprises a feeding hopper 515 and a receiving cavity 516. The feeding hopper 515 is configured to receive the particulars of the blends of PP and/or PE and PC and/or PET. The receiving cavity 516 is provided with a driving screw 517. An outlet of the feeding hopper 515 is communicated with a front end inlet 518 of the receiving cavity 516, a rear end outlet 519 of the receiving cavity 516 is communicated with an inlet of a pipe 507, and an outlet of the pipe 507 is communicated with a second inlet 520 of the dispenser 503.

The first inlet 514 of the dispenser 503 is communicated with an inlet of a first branch line 521 and an inlet of the second branch line 522 of the dispenser, and the second inlet 520 of the dispenser 503 is communicated with an inlet of a third branch line 523 of the dispenser. As shown in FIG. 5, the third branch line 523 is located between the first branch line 521 and the second branch line 522. An outlet of the first branch line 521, an outlet of the second branch line 522 and an outlet of the third branch line 523 converge at an outlet 524 of the dispenser. The outlet 524 of the dispenser is connected to an inlet of a conduit 525, and an outlet of the conduit 525 is communicated with an inlet of a die cavity 526 of a die head 504. The die cavity 526 of the die head 504 has an appropriate width and depth so that the die cavity is sufficient to receive a material delivered from the pipe of the dispenser, and the die cavity 526 is flat so that the material delivered from the pipe of the dispenser is die pressed into a flat shape therein. The die pressed material is delivered through an outlet of the die cavity 526 to a forming roller apparatus 505. The forming roller apparatus 505 comprises a plurality of forming rollers placed adjacent to one another. The material delivered from the die cavity of the die head to the forming roller apparatus is stretched, roll pressed and cooled between the plurality of forming rollers to achieve a desired thickness and form a sheet material. FIG. 5 shows three such forming rollers 505.1, 505.2 and 505.3. Two or more forming rollers may be used in other embodiments.

According to the co-extruding assembly line 500 shown in FIG. 5, the insulation film 100 according to the present invention is produced in the following procedure:

During production, the receiving cavities 510 and 516 of the first extruder 501 and the second extruder 502 are heated, and the driving screws 511 and 517 of the first extruder 501 and the second extruder 502 are rotated.

The PC or PET particles containing the retardant are fed to the feeding hopper 509 of the first extruder 501. The rotation of the driving screw 511 of the first extruder 501 pushes the PC or PET particles containing the flame retardant in the feeding hopper 509 into the receiving cavity 510. Since the receiving cavity 510 is heated, the PC or PET particles containing the flame retardant, after entry into the receiving cavity 510, are melted due to heat generated from friction and are in a molten state. Affected by the pushing force generated by rotation of the driving screw 511, the PC or PET containing the flame retardant in the molten state is delivered to the rear end outlet 513 of the receiving cavity 510. The pushing force generated by rotation of the driving screw 511 enables the PC or PET containing the flame retardant in the molten state to flow out of the receiving cavity 510 from the rear end outlet 513 of the receiving cavity 510, and then enters the pipe 506 through the inlet of the pipe 506 communicated with the rear end outlet 513 of the receiving cavity 510. The PC or PET containing the flame retardant in the molten state flows out through the outlet of the pipe 506 to the first inlet 514 of the dispenser 503. At the inlet 514 of the dispenser, the PC or PET containing the flame retardant in the molten state is divided into two flows: one enters the first branch line 521 of the dispenser to become a first molten PC or PET containing flame retardant, and the other enters the third branch line 522 of the dispenser to become a second molten PC or PET containing flame retardant.

Similarly, the particles of the blends of PP and/or PE and PC and/or PET are fed to the feeding hopper 515 of the second extruder 502. The rotation of the driving screw 517 of the second extruder 502 pushes the particles of the blends of PP and/or PE and PC and/or PET in the feeding hopper 515 into the receiving cavity 516. Since the receiving cavity 516 is heated, the particles of the blends of PP and/or PE and PC and/or PET, after entry into the receiving cavity 516, are melted due to heat generated from friction and are in a molten state. Affected by the pushing force generated by rotation of the driving screw 517, the blends of PP and/or PE and PC and/or PET in the molten state is delivered to the rear end outlet 519 of the receiving cavity 516. The pushing force generated by rotation of the driving screw 517 enables the blends of PP and/or PE and PC and/or PET in the molten state to flow out of the receiving cavity 516 from the rear end outlet 519 of the receiving cavity 516, and then enters the pipe 507 through the inlet of the pipe 507 communicated with the rear end outlet 519 of the receiving cavity 516. The blends of PP and/or PE and PC and/or PET in the molten state flows out through the outlet of the pipe 507 to the second inlet 520 of the dispenser 503, and enters the third branch line 523 of the dispenser via the second inlet 503. Noticeably, the operation for the particles of the blends of PP and/or PE and PC and/or PET is performed at the same time as the previously-described operation for the PC or PET containing the flame retardant.

The first molten PC or PET containing flame retardant entering the first branch line 521 of the dispenser 503, the blends of PP and/or PE and PC and/or PET in the molten state entering the third branch line 523 of the dispenser 503 and the second molten PC or PET containing flame retardant entering the second branch line 522 of the dispenser 503 converge at the outlet 524 of the dispenser to thereby superimpose together, and then enters the die cavity 526 of the die head 504 via the conduit 525 communicated with the outlet 524 of the dispenser so that the first and second molten PC or PET and the blends of PP and/or PE and PC and/or PET in the molten state are die pressed in the die cavity 526 to form a flat molten mass. The die pressed flat molten mass is delivered to between the forming rollers 505.1 and 505.2 to receive a stretching and pressing force applied by the forming rollers 505.1 and 505.2 thereto, and meanwhile it is cooled by the forming rollers 505.1 and 505.2 to thereby form a sheet or film 100' with a predetermined thickness. The film 100' continued to be fed between the forming rollers 505.2 and 505.3 for further cooling or annealing to form the insulation film or sheet 100 according to one embodiment of the present invention. As needed, the die pressed flat molten mass outputted from the die head may run through only two forming rollers or more than two forming rollers to form the film.

Figure 6:
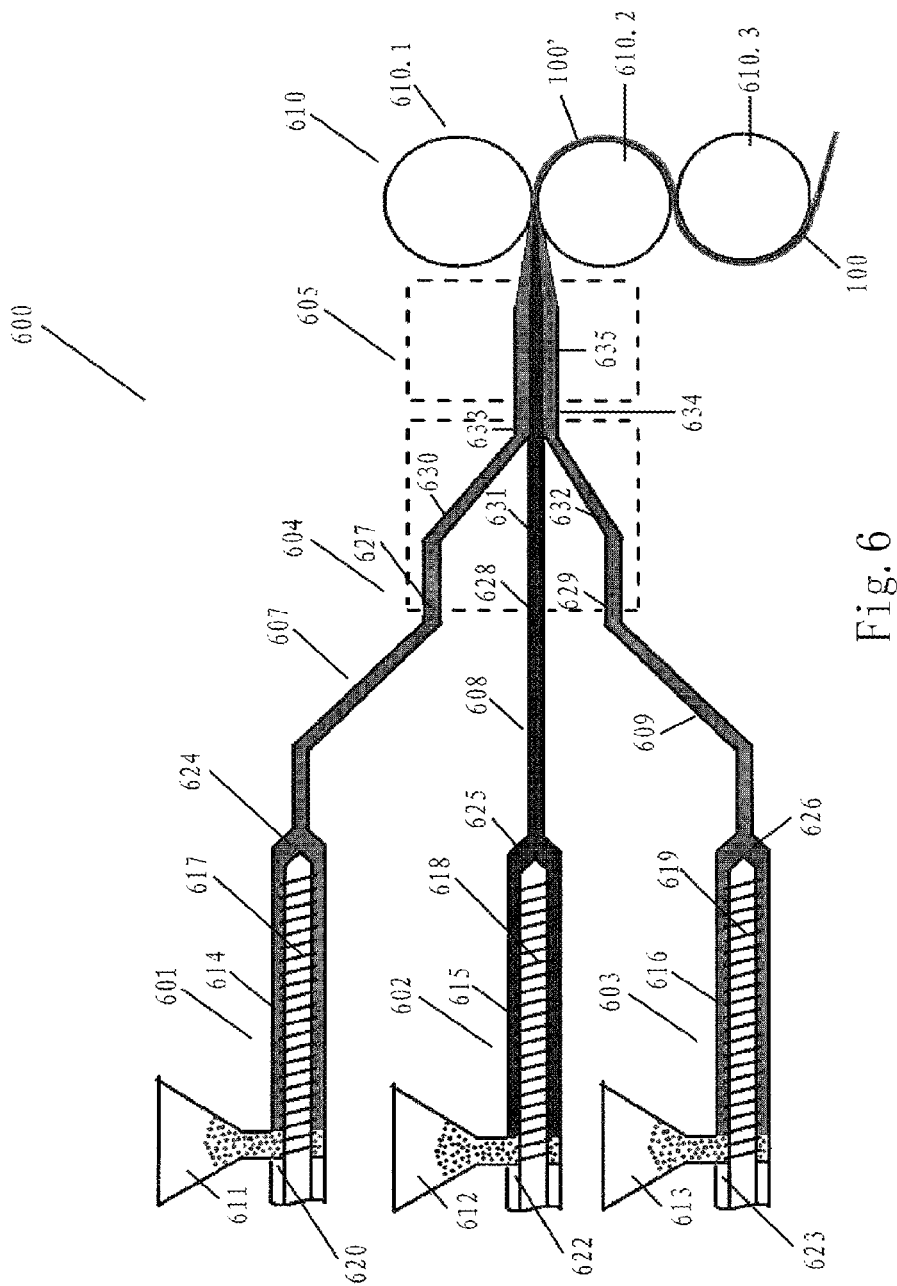
FIG. 6 is an exemplary view of another co-extruding process for producing the insulation film according to an embodiment of the present invention.

FIG. 6 illustrates a co-extruding assembly line 600 of another co-extruding process for producing the insulation film 100 according to an embodiment of the present invention. As shown in FIG. 6, the co-extruding assembly line 600 comprises a first extruder 601, a second extruder 602 and a third extruder 603. The first extruder 601, the second extruder 602 and the third extruder 603 respectively comprise a feeding hopper 611, 612, 613, a receiving cavity 614, 615, 616 and a driving screw 617, 618 and 619. The feeding hoppers of the first and third extruders 611 and 613 are configured to receive PC or PET particles containing the flame retardant. The feeding hopper of the second extruder 612 is configured to receive the particles of the blends of PP and/or PE and PC and/or PET. An outlet of the feeding hopper 611 of the first extruder 601 is communicated with a front end inlet 620 of the receiving cavity 614, a rear end outlet 624 of the receiving cavity 614 is communicated with an inlet of a pipe 607, and an outlet of the pipe 607 is communicated with a first inlet 627 of a dispenser 604. Similarly, an outlet of the feeding hopper 612 of the second extruder 602 is communicated with a front end inlet 622 of the receiving cavity 615, a rear end outlet 625 of the receiving cavity 615 is communicated with an inlet of a pipe 608, and an outlet of the pipe 608 is communicated with a second inlet 628 of the dispenser 604. An outlet of the feeding hopper 613 of the third extruder 603 is communicated with a front end inlet 623 of the receiving cavity 616, a rear end outlet 626 of the receiving cavity 616 is communicated with an inlet of a pipe 609, and an outlet of the pipe 609 is communicated with a third inlet 629 of the dispenser 604.

The first inlet 627 of the dispenser 604 is communicated with an inlet of a first branch line 630 of the dispenser, a second inlet 628 of the dispenser 604 is communicated with an inlet of a second branch line 631 of the dispenser, and a third inlet 629 of the dispenser 604 is communicated with an inlet of the of the third branch line 632 of the dispenser. As shown in FIG. 6, the second branch line 631 is located between the first branch line 630 and the third branch line 623. An outlet of the first branch line 630, an outlet of the second branch line 631 and an outlet of the third branch line 632 converge at an outlet 633 of the dispenser. The outlet 633 of the dispenser is communicated with an inlet of a conduit 634, and an outlet of the conduit 634 is communicated with an inlet of a die cavity 635 of a die head 605. The die cavity 635 of the die head 605 has an appropriate width and depth so that the die cavity is sufficient to receive a material delivered from the pipe of the dispenser, and the die cavity 635 is flat so that the material delivered from the pipe of the dispenser is die pressed into a flat shape therein. The die pressed material is delivered through an outlet of the die cavity 635 to a forming roller apparatus 610. The forming roller apparatus 610 comprises a plurality of forming rollers placed adjacent to one another. The material delivered from the die cavity of the die head to the forming roller apparatus is stretched, roll pressed and cooled between the plurality of forming rollers to achieve a desired thickness and form a sheet material. FIG. 6 shows three such forming rollers 610.1, 610.2 and 610.3. Two or more forming rollers may be used in other embodiments.

According to the co-extruding assembly line 600 shown in FIG. 6, the insulation film 100 according to the present invention is produced in the following procedure:

During production, the receiving cavities 614, 615 and 616 of the first extruder 601, the second extruder 602 and the third extruder 603 are heated, and the driving screws 617, 618 and 619 of the first extruder 601, the second extruder 602 and the third extruder 603 are rotated.

The PC or PET particles containing the flame retardant are fed to the feeding hopper 611 of the first extruder 601. The rotation of the driving screw 617 of the first extruder 601 pushes the PC or PET particles containing the flame retardant in the feeding hopper 611 into the receiving cavity 614. Since the receiving cavity 614 is heated, the PC or PET particles containing the flame retardant, after entry into the receiving cavity 614, are melted due to heat generated from friction and are in a molten state. Affected by the pushing force generated by rotation of the driving screw 617, the PC or PET containing the flame retardant in the molten state is delivered to the rear end outlet 624 of the receiving cavity 614. The pushing force generated by rotation of the driving screw 617 enables the PC or PET containing the flame retardant in the molten state to flow out of the receiving cavity 614 from the rear end outlet 624 of the receiving cavity 614, and then enters the pipe 607 through the inlet of the pipe 607 communicated with the rear end outlet 624 of the receiving cavity 614. The PC or PET containing the flame retardant in the molten state flows out through the outlet of the pipe 607 to the first inlet 627 of the dispenser 604, and enters the first branch line 630 of the dispenser 604. The PC or PET containing the flame retardant entering the first branch line 630 of the dispenser 604 is a first molten PC or PET containing the flame retardant.

Similarly, the PC or PET particles containing the flame retardant are fed to the feeding hopper 613 of the third extruder 603. The PC or PET particles containing the flame retardant are delivered into the third branch line 632 of the dispenser 604 in the same manner as the PC or PET particles containing the flame retardant in the feeding hopper 611 of the first extruder 601, and the PC or PET containing the flame retardant entering the third branch line 632 of the dispenser 604 is a second molten PC or PET containing the flame retardant.

The particles of the blends of PP and/or PE and PC and/or PET are fed to the feeding hopper 612 of the second extruder 602. The particles of the blends of PP and/or PE and PC and/or PET are delivered into the second branch line 631 of the dispenser 604 in the same manner as the PC or PET particles containing the flame retardant in the feeding hopper 611 of the first extruder 601.

Noticeably, operation is performed at the same time for delivering the PC or PET particles containing the flame retardant and the blends of PP and/or PE and PC and/or PET respectively to the first branch line 630, the second branch line 631 and the third branch line 632.

Similar to the extruding process in the assembly line shown in FIG. 5, the first molten PC or PET containing the flame retardant entering the first branch line 630 of the dispenser 604, the blends of PP and/or PE and PC and/or PET in the molten state entering the second branch line 631 of the dispenser 604 and the second molten PC or PET containing flame retardant entering the third branch line 632 of the dispenser converge at the outlet 633 of the dispenser to thereby superimpose together, and then enters the die cavity 635 of the die head 605 via the conduit 634 communicated with the outlet 633 of the dispenser so that the first and second molten PC or PET and the blends of PP and/or PE and PC and/or PET in the molten state are die pressed in the die cavity 635 to form a flat molten mass. The die pressed flat molten mass is delivered to between the forming rollers 610.1 and 610.2 to receive a stretching and pressing force applied by the forming rollers 610.1 and 610.2 thereto, to thereby form a sheet or film 100' with a predetermined thickness. The film 100' continued to be fed between the forming rollers 610.2 and 610.3 for further cooling or annealing to form the insulation film or sheet 100 according to one embodiment of the present invention. As needed, the die pressed flat molten mass outputted from the die head may run through only two forming rollers or more than two forming rollers to form the film.

Before the invention, there is not a precedent that the co-extruding process is used for producing the insulation film. Conventionally, the thickness of the intermediate layer of the product produced by the co-extruding process accounts for a relatively high percentage of the total thickness of the product. In the insulation film produced by the co-extruding process according to the present invention, the thickness of the intermediate layer accounts for a relatively low percentage of the total thickness of the insulation film, namely, only 5%-50% of the total thickness of the insulation film. By employing the co-extruding process of the present invention, the respective layers can still be evenly distributed under the circumstances that the thickness of the intermediate layer accounts for a relatively low percentage of the total thickness of the insulation film.

In the co-extruding production process shown in FIG. 5 and FIG. 6, the first molten PC or PET containing the flame retardant, blends of PP and/or PE and PC and/or PET in the molten state, and the second molten PC or PET containing the flame retardant are superimposed in the dispenser. However, those skilled in the art should appreciate that the first molten PC or PET containing the flame retardant, the blends of PP and/or PE and PC and/or PET in the molten state, and the second molten PC or PET containing the flame retardant may also be superimposed in the die head.

The insulation film produced by the co-extruding process is of high quality, but the co-extruding process imposes high requirements for the apparatus. Therefore, the present invention further provides a method of producing the insulation film by a composite process, which imposes lower requirements for the apparatus.

Figure 7:
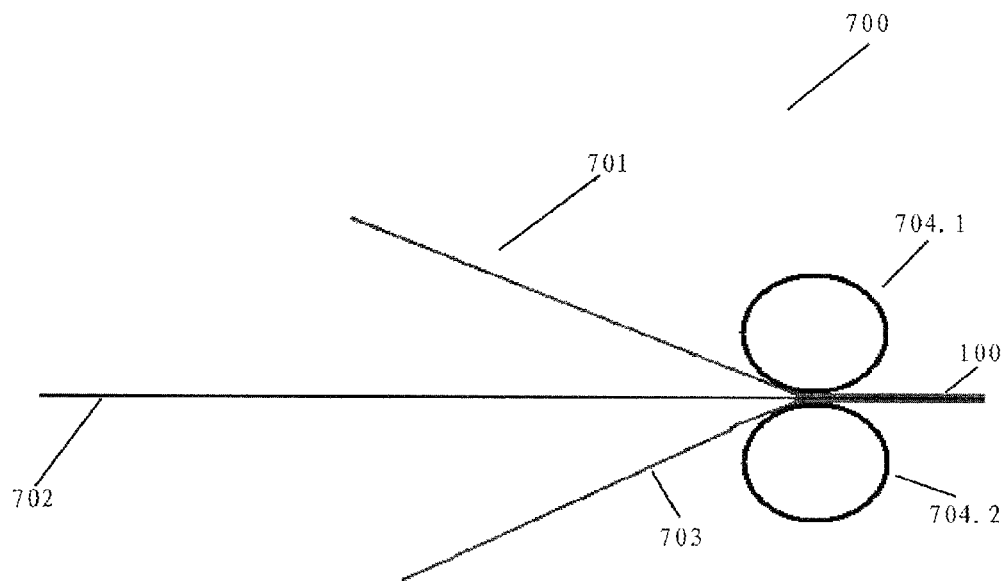
FIG. 7 is an exemplary view of a composite process for producing the insulation film according to an embodiment of the present invention.

FIG. 7 is a composite assembly line 700 of a composite process for producing the insulation film 100 according to an embodiment of the present invention, comprising a pair of pressing rollers 704.1 and 704.2. An upper layer 701, an intermediate layer 702 and a lower layer 703 of the insulation film 100 are respectively wound on three delivery rollers (not shown), and meanwhile inputted between the pressing rollers 704.1 and 704.2. When the pressing rollers 704.1 and 704.2 rotate relative to each other, a pulling force will be generated for the upper layer 701, the intermediate layer 702 and the lower layer 703 so that the delivery rollers are moved to release the upper layer 701, the intermediate layer 702 and the lower layer 703 respectively for the pressing rollers 704.1 and 704.2. As such, the upper layer 701, the intermediate layer 702 and the lower layer 703 are wound between and run through between the pressing rollers 704.1 and 704.2 so that the upper layer 701, the intermediate layer 702 and the lower layer 703 are pressed to form the insulation film 100.

In FIG. 7, the upper layer 701 and the lower layer 703 of the insulation film 100 is made of PC or PET material containing the flame retardant, and the intermediate layer 702 of the insulation film 100 is the layer made of the blends of PP and/or PE and PC and/or PET. After the upper layer 701, the intermediate layer 702 and the lower layer 703 of the insulation film 100 are released from respective delivery rollers and before they are wound between and run through the pressing rollers 704.1 and 704.2, a glue is applied to a lower surface of the upper layer 701 and/or an upper surface of the intermediate layer 702, and a glue is applied on a lower surface of the intermediate layer 702 and/or an upper surface of the lower layer 703 so that the upper layer 701, the intermediate layer 702 and the lower layer 703 of the insulation film 100 are, after being pressed by the pressing rollers 704.01 and 704.02, adhered together to form the insulation film 100.

Figure 8:
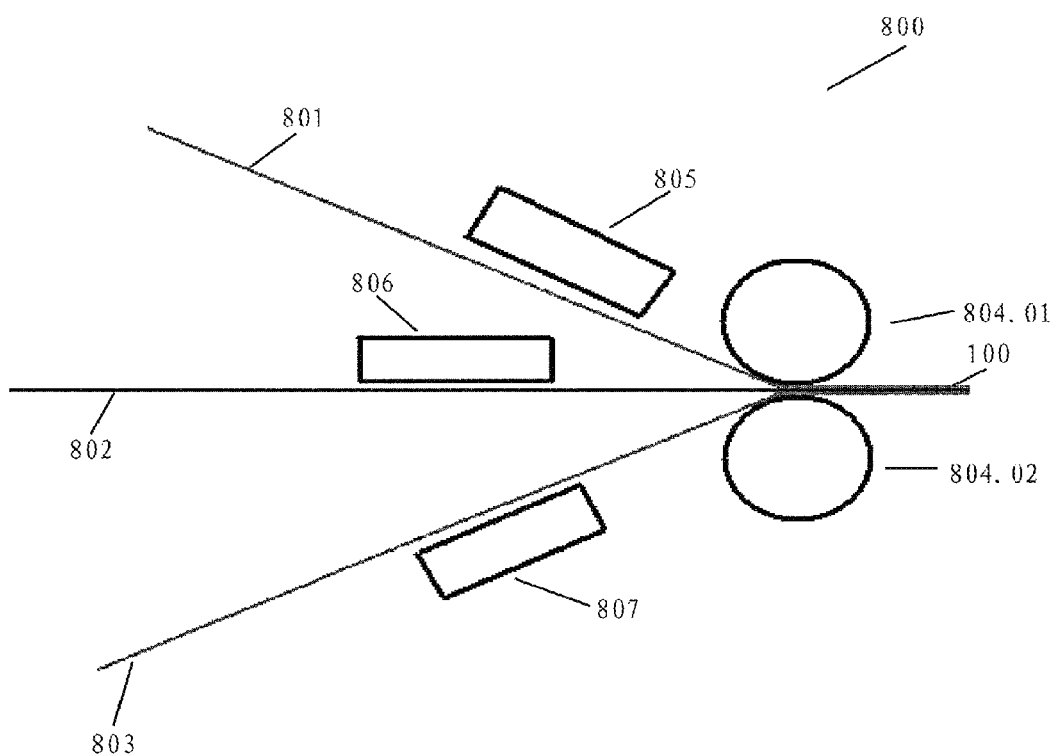
FIG. 8 is an exemplary view of a composite process for producing the insulation film according to an embodiment of the present invention.

FIG. 8 is another composite assembly line 800 of a composite process for producing the insulation film 100 according to an embodiment of the present invention. The composite assembly line 800 in FIG. 8 is similar to the composite assembly line 700 of FIG. 7. The only difference therebetween is that in FIG. 8, a baker 805, 806 and 807 is respectively provided on one side of a path from the respective delivery rollers for an upper layer 801, an intermediate layer 802 and a lower layer 803 of the insulation film 100 to between pressing rollers 804.01 and 804.02.

In FIG. 8, after the upper layer 801, the intermediate layer 802 and the lower layer 803 of the insulation film 100 are released from respective delivery rollers and before they are wound between and run through the pressing rollers 804.1 and 804.2, the upper layer 801, the intermediate layer 802 and the lower layer 803 of the insulation film 100 are heated by the respective bakers to soften them so that the upper layer 801, the intermediate layer 802 and the lower layer 803 of the softened insulation film 100 are, after being pressed by the pressing rollers 804.01 and 804.02, adhered together to form the insulation film 100.

Although FIG. 8 only illustrates a method of heating the upper layer 801, the intermediate layer 802 and the lower layer 803 of the insulation film via the bakers, those skilled in the art should appreciate that the upper layer 801, the intermediate layer 802 and the lower layer 803 are softened in other manners to soften them.

It should be noted that any one value in the ranges of the values indicated in the present application is applicable to the present invention.

Although the description illustrates, describes and points out novel features of the present invention applicable to preferred embodiments of the present invention, it should be appreciated that without departing from the spirit of the present invention, those skilled in the art may omit, substitute or change the form and details of the illustrated apparatus and its operation. For example, it is particularly noticeable that combinations of those elements and/or steps of the method for performing the substantially the same functions in substantively same manners to achieve the same result fall within the scope of the present invention. Besides, it should be appreciated that the forms disclosed in the present invention or structures and/or members and/or steps of the method shown and/or described in the embodiments might, as options of design, be combined into other forms or embodiments. Therefore, the scope of the present invention is only limited to the scope as defined by the appended claims.

What is claimed is:

1. A method of producing an insulation film, wherein said insulation film comprises:

a film upper layer and a film lower layer, wherein the film upper layer is made of PC or PET material and the film lower layer is made of PC or PET material, and the PC or PET material contains a flame retardant to meet flame retardance thereof;

a film intermediate layer located between the film upper layer and the film lower layer, wherein the film intermediate layer is made of blends of PP and/or PE and PC; and wherein an upper surface of the film intermediate layer is bound together with a lower surface of the film upper layer, and a lower surface of the film intermediate layer is bound together with an upper surface of the film lower layer, the method comprising:

on a first extruder, extruding PC or PET particles containing the flame retardant to melt them, the PC or PET containing the flame retardant in a molten state flowing out of the first extruder and then through subsequent connected pipes into a dispenser, the dispenser dividing the PC or PET containing the flame retardant in the molten state extruded out of the first extruder into two flows, namely, a first molten PC or PET containing the flame retardant and a second molten PC or PET containing the flame retardant;

extruding on a second extruder the particles of the blends of PP and/or PE and PC and/or PET to make them molten, the blends of PP and/or PE and PC and/or PET in the molten state flowing out of the second extruder and then through subsequent connected pipes into the dispenser, the blends of PP and/or PE and PC and/or PET in the molten state flowing into between the first molten PC or PET containing the flame retardant and the second molten PC or PET containing the flame retardant in the dispenser;

the first molten PC or PET containing flame retardant, the blends of PP and/or PE and PC and/or PET in the molten state and the second molten PC or PET containing flame retardant being superimposed together and then flowing out of the dispenser, flowing through a die head into a cooling forming roller to be cooled and formed as a sheet/film.

2. The method of claim 1, wherein the film upper layer and the film lower layer of the insulation film are made of similar or same material.

3. The method of claim 1, wherein the flame retardant in the film upper layer and the film lower layer of the insulation film comprises a phosphor-containing flame retardant or a silicon-containing flame retardant or a bromine-containing flame retardant or a chlorine-containing flame retardant.

4. The method of claim 3, wherein the PC or PET in the film upper layer and the film lower layer of the insulation film accounts for 75%-99.7% of a mass of the film upper layer or film lower layer, and the flame retardant accounts for 0.3-25 of the mass of the film upper layer or the film lower layer.

5. The method of claim 4, wherein the PP and/or PE in the film intermediate layer accounts for 5%-95% of a mass of the film intermediate layer, the PC in the film intermediate layer accounts for 4.5%-94.7% of a mass of the film intermediate layer and additives in the film intermediate layer accounts for 0.3%-20% of a mass of the film intermediate layer.

6. The method of claim 1, wherein the thickness of the film intermediate layer of the insulation film is 5%-50% of the thickness of the insulation film, and the thickness of the film upper layer and the film lower layer is 50%-95% of a total thickness of the insulation film.

7. The method of claim 1, wherein the total thickness of the insulation film is in a range of 0.05 mm-3.0 mm.

8. A method of producing an insulation film, wherein said insulation film comprises:
a film upper layer and a film lower layer, wherein the film upper layer is made of PC or PET material and the film lower layer is made of PC or PET material, and the PC or PET material contains a flame retardant to meet flame retardance thereof;
a film intermediate layer located between the film upper layer and the film lower layer,
wherein the film intermediate layer is made of blends of PP and/or PE and PC; and
wherein an upper surface of the film intermediate layer is bound together with a lower surface of the film upper layer, and a lower surface of the film intermediate layer is bound together with an upper surface of the film lower layer,
the method comprising:
on a first extruder, extruding PC or PET particles containing the flame retardant to melt them to form a first molten PC or PET containing the flame retardant, the first molten PC or PET containing the flame retardant flowing out of the first extruder and then through subsequent connected pipes into a dispenser;
extruding on a third extruder PC or PET particles containing the flame retardant to make them molten to form a second molten PC or PET containing the flame retardant, the second molten PC or PET containing the flame retardant being extruded out of the third extruder and then flowing through subsequent connected pipes into the dispenser;
extruding on a second extruder the particles of the blends of PP and/or PE and PC and/or PET to make them molten, the blends of PP and/or PE and PC and/or PET in the molten state flowing out of the second extruder and then through subsequent connected pipes into the dispenser, the blends of PP and/or PE and PC and/or PET in the molten state flowing into between the first molten PC or PET containing the flame retardant and the second molten PC or PET containing the flame retardant in the dispenser;
the first molten PC or PET containing flame retardant, the blends of PP and/or PE and PC and/or PET in the molten state and the second molten PC or PET containing flame retardant being superimposed together and then flowing out of the dispenser, flowing through a die head into a cooling forming roller to be cooled and formed as a sheet/film.

9. The method of claim 8, wherein the film upper layer and the film lower layer of the insulation film are made of similar or same material.

10. The method of claim 8, wherein the flame retardant in the film upper layer and the film lower layer of the insulation film comprises a phosphor-containing flame retardant or a silicon-containing flame retardant or a bromine-containing flame retardant or a chlorine-containing flame retardant.

11. The method of claim 10, wherein the PC or PET in the film upper layer and the film lower layer of the insulation film accounts for 75%-99.7% of a mass of the film upper layer or film lower layer, and the flame retardant accounts for 0.3-25 of the mass of the film upper layer or the film lower layer.

12. The method of claim 11, wherein the PP and/or PE in the film intermediate layer accounts for 5%-95% of a mass of the film intermediate layer, the PC in the film intermediate layer accounts for 4.5%-94.7% of a mass of the film intermediate layer and additives in the film intermediate layer accounts for 0.3%-20% of a mass of the film intermediate layer.

13. The method of claim 8, wherein the thickness of the film intermediate layer of the insulation film is 5%-50% of the thickness of the insulation film, and the thickness of the film upper layer and the film lower layer is 50%-95% of a total thickness of the insulation film.

14. The method of claim 8, wherein the total thickness of the insulation film is in a range of 0.05 mm-3.0 mm.

15. A method of producing an insulation film, wherein said insulation film comprises:
a film upper layer and a film lower layer, wherein the film upper layer is made of PC or PET material and the film lower layer is made of PC or PET material, and the PC or PET material contains a flame retardant to meet flame retardance thereof;
a film intermediate layer located between the film upper layer and the film lower layer,
wherein the film intermediate layer is made of blends of PP and/or PE and PC; and
wherein an upper surface of the film intermediate layer is bound together with a lower surface of the film upper layer, and a lower surface of the film intermediate layer is bound together with an upper surface of the film lower layer, the method comprising:
  providing a film upper layer and a film lower layer, wherein both of the film upper layer and film lower layer are made of a PC or PET material and the PC or PET material contains a flame retardant to meet the flame retardance thereof;
  providing an intermediate layer located between the film upper layer and the film lower layer, the film intermediate layer is made of the blends of PP and/or PE and PC and/or PET;
  applying a glue to a lower surface of the film upper layer and/or an upper surface of the film intermediate layer, and applying a glue on an upper surface of the film lower layer and/or a lower surface of the film intermediate layer;
  delivering the film upper layer, film intermediate layer and film lower layer through pressing rollers to be pressed and formed as a sheet/film.

16. The method of claim 15, wherein the film upper layer and the film lower layer of the insulation film are made of similar or same material.

17. The method of claim 15, wherein the flame retardant in the film upper layer and the film lower layer of the insulation film comprises a phosphor-containing flame retardant or a silicon-containing flame retardant or a bromine-containing flame retardant or a chlorine-containing flame retardant.

18. The method of claim 17, wherein the PC or PET in the film upper layer and the film lower layer of the insulation film accounts for 75%-99.7% of a mass of the film upper layer or film lower layer, and the flame retardant accounts for 0.3-25 of the mass of the film upper layer or the film lower layer.

19. The method of claim 18, wherein the PP and/or PE in the film intermediate layer accounts for 5%-95% of a mass of the film intermediate layer, the PC in the film intermediate layer accounts for 4.5%-94.7% of a mass of the film intermediate layer and additives in the film intermediate layer accounts for 0.3%-20% of a mass of the film intermediate layer.

20. The method of claim 15, wherein the thickness of the film intermediate layer of the insulation film is 5%-50% of the thickness of the insulation film, and the thickness of the film upper layer and the film lower layer is 50%-95% of a total thickness of the insulation film.

* * * * *